3,074,906
Patented Jan. 22, 1963

3,074,906
BLENDS OF (A) CONJUGATED DIOLEFINE-AL-
KYL ARYL VINYLIDENES - ACRYLONITRILE
GRAFT COPOLYMER WITH (B) CONJUGATED
ALIPHATIC DIOLEFINE-MONOVINYL AROMAT-
IC HYDROCARBON/ALKYL ALKACRYLATE
GRAFT COPOLYMER
William C. Calvert, Gary, Ind., assignor to Borg-Warner
Corporation, Chicago, Ill., a corporation of Illinois
No Drawing. Filed Apr. 27, 1959, Ser. No. 808,941
10 Claims. (Cl. 260—45.5)

This invention relates to polymeric product blends exhibiting physical properties superior to those of the individual polymeric components employed in forming the blends. As used in this specification, and as defined in the Report on Nomenclature of the International Union of Pure and Applied Chemistry, Journal of High Polymer Science, volume 8, page 260, the term "graft copolymer" designates a high polymer, the molecules of which consist of two or more polymer parts of different compositions, chemically united together. A graft copolymer may be produced, for example, by polymerization of a given kind of monomer with subsequent polymerization of another kind of monomer onto the product of the first polymerization.

Graft copolymers of a conjugated diolefine polymer latex or a conjugated diolefine-vinyl aromatic hydrocarbon copolymer latex with a mixture of a vinyl aromatic hydrocarbon or an alkylaryl vinylidene and vinyl cyanide or a vinyl cyanide type compound are known. In the preparation of these graft copolymers, the organic reactants (i.e., neglecting the water of the latex and the various auxiliaries such as catalysts, emulsifying agents, etc.) comprise from 20% to 60% by weight of conjugated diolefine polymer or of conjugated diolefine-vinyl aromatic hydrocarbon copolymer while the mixture of vinyl aromatic hydrocarbon or alkylaryl vinylidene with vinyl cyanide or vinyl cyanide type compound represents, correspondingly, from 80% to 40% by weight of the organic reactants. Considering the components of this monomer mixture individually, the vinyl cyanide or vinyl cyanide type compound comprises 10% to 30% by weight while the vinyl aromatic hydrocarbon or alkylaryl vinylidene comprises 30% to 70% by weight of the organic reactants.

Graft copolymers of polybutadiene latex with a mixture of styrene and acrylonitrile and graft copolymers of butadiene-styrene copolymer latex with a mixture of styrene and acrylonitrile are specific examples of such graft copolymers. However, in the preparation of these materials, the polybutadiene latex of the first of the above specific examples may be replaced, in part or entirely, by other conjugated diolefine polymer latices. In the preparation of such other polymer latices the butadiene may be replaced, in part or entirely, by isoprene, pentadiene-1,3, the methyl 1,3-pentadienes, dimethyl butadiene-1,3, the 1,3- and 2,4-hexadienes, and the like, including mixtures of two or more such conjugated diolefines (including butadiene-1,3).

Likewise, in the preparation of these materials the butadiene-styrene copolymer latex of the second of the above specific examples may be replaced, in part or entirely, by other conjugated diolefine-vinyl aromatic hydrocarbon copolymer latices. In the preparation of such other copolymer latices, the butadiene component may be replaced, in part or entirely, by isoprene, dimethyl butadiene-1,3, the 1,3- and 2,4-hexadienes, pentadiene-1,3, the methyl 1,3-pentadienes, and the like, including mixtures of two or more such conjugated diolefines (including butadiene-1,3), while the styrene component may be replaced, in part or entirely, by other vinyl aromatic hydrocarbons such as a vinyl toluene and the like, including mixtures of two or more vinyl aromatic hydrocarbons (including styrene).

Additionally, in the preparation of these graft copolymers, the styrene monomer of the above specific examples may be replaced, in part or entirely, by other vinyl aromatic hydrocarbons such as the vinyl toluenes and by alkylaryl vinylidenes such as alpha methyl styrene, the alpha methyl vinyl toluenes and the like, including mixtures of two or more such hydrocarbons (including styrene).

Also, if desired, in the preparation of these graft copolymers the acrylonitrile monomer may be replaced, in part or entirely, with other vinyl cyanide type compounds such as methacrylonitrile and the like, including mixtures of two or more such compounds (including acrylonitrile).

Graft copolymers prepared from the components and by the procedures outlined above are solid, thermoplastic materials of high commercial utility. They are hard and tough materials of high impact value and are eminently suited for use in the production of structural shapes such as pipe, luggage, radio cabinets, automobile instrument panels, etc.

I have found that the already excellent physical properties of these graft copolymers may be further enhanced by blending a predominant proportion of these with a small quantity of another solid, thermoplastic graft copolymer of a nature to be described in detail subsequently. The resulting blends are characterized by a greatly enhanced elongation (and a different type of elongation), a higher surface hardness and a higher melt index in comparison with the straight graft copolymers previously described. Also, these blends show better aging characteristics on exterior exposure than do these straight graft copolymers. With respect to such physical properties as tensile strength, heat distortion point and notched impact value, the blends of the present invention are scarely to be distinguished from the corresponding properties of these straight graft copolymers.

One object of this invention is to provide blends of polymeric products exhibiting physical properties superior to those of the individual components of the blends.

Another object of this invention is to provide blends of polymeric products exhibiting an enhanced elongation in comparison with the individual components of the blends.

A further object of this invention is to provide blends of polymeric products having a higher melt index than that of the indidvidual components of the blends.

An additional object of this invention is to provide blends of polymeric products exhibiting a higher surface hardness than that of the individual components of the blends.

Other objects of this invention will become apparent as the description thereof proceeds.

The graft copolymer blending components incorporated into a predominant proportion of the previously described graft copolymers to form the blends of the present invention are graft copolymers of a conjugated diolefine-vinyl aromatic hydrocarbon copolymer latex and an alkyl alkacrylate or a mixture of an alkyl alkacrylate and a vinyl aromatic hydrocarbon. In the preparation of these blending components the organic reactants may comprise neglecting the water of the latex and the various auxiliaries such as catalysts, emulsifying agents, etc.) from 20% to 50% by weight of conjugated diolefine-vinyl aromatic hydrocarbon copolymer while the monomer or monomer mixture polymerized therewith represents, correspondingly, from 80% to 50% by weight of the organic reactants.

To facilitate further exposition and wherever necessary to avoid the possibility of confusion, graft copolymers described in the second paragraph of this specification are designated "A" herein while "blending component B" is the designation applied to the graft copolymers described in the previous paragraph which are blended in a small quantity with a predominant amount of A to form the blends of this invention.

Confining attention to the conjugated diolefine-vinyl aromatic hydrocarbon copolymer latex employed in the preparation of blending components B, the ratio of conjugated diolefine to vinyl aromatic hydrocarbon does not appear to be critical, ratios of from 1:3 to 9:1 being quite satisfactory.

Likewise, confining attention to the monomer mixture employed in the production of blending components B, this may consist of an alkyl alkacrylate-vinyl aromatic hydrocarbon mixture in a ratio of from 1:3 upwards to as high as infinity in the limiting case when an alkyl alkacrylate alone is polymerized with the conjugated diolefin-vinyl aromatic hydrocarbon copolymer latex.

Graft copolymers of a butadiene-styrene copolymer latex with methyl methacrylate or with a methyl methacrylate-styrene mixture are specific examples of blending components B employed in forming the blends of this invention. However, in the preparation of these materials, the butadiene-styrene copolymer latex of these specific examples may be replaced, in part or entirely, by other conjugated diolefine-vinyl aromatic hydrocarbon copolymer latices. In the preparation of such other copolymer latices, the butadiene component may be replaced, in part or entirely, by isoprene, pentadiene-1,3, the methyl 1,3-pentadienes, dimethyl butadiene-1,3, the 1,3- and 2,4-hexadienes, and the like, including mixtures of two or more such conjugated diolefines (including butadiene-1,3), while the styrene component may be replaced, in part or entirely, by other vinyl aromatic hydrocarbons such as a vinyl toluene and the like, including mixtures of two or more vinyl aromatic hydrocarbons (including styrene).

Additionally, in the preparation of these materials, the methyl methacrylate of the monomer or monomer mixture may be replaced, in part or entirely, by other alkyl alkacrylates such as methyl ethacrylate, ethyl ethacrylate, and the like, including mixtures of two or more such compounds (including methyl methacrylate).

Also, if desired, in the preparation of these graft copolymers, the styrene of the monomer mixture of the second specific example above given may be replaced, in part or entirely, by other vinyl aromatic hydrocarbons such as the vinyl toluenes and the like, including mixtures of two or more such hydrocarbons (including styrene).

For the better understanding of this invention, specific illustrative but non-limiting examples of the preparation and properties of representative blending components B are set forth immediately below following which specific illustrative but non-limiting examples of the preparation and properties of blends containing a predominant proportion of an A admixed with a small quantity of a blending component B are given.

Example 1

As a rule, commercially available butadiene-styrene copolymer latices were employed in forming the blending components B employed in this invention. However, in one instance, a commercial latex having a certain desired butadiene-styrene ratio was not readily available and accordingly a latex of this particular ratio was prepared using the recipe and procedures set forth below. (The numerical values given in the tabulation are parts by weight.)

| | |
|---|---|
| Butadiene | 90 |
| Styrene | 10 |
| Water, total | 158 |
| Sodium alkyl aryl sulfonate | 2 |
| Sodium hydroxide | 0.1 |
| Sodium salt ethylenediamine tetra-acetic acid (30% solution) | 0.254 |
| Commercial glucose | 0.5 |
| Ferrous sulfate heptahydrate | 0.034 |
| Sodium dodecyl benzene sulfonate (Note A) | 2.0 |
| p-Menthane hydroperoxide (Note B) | 0.17 |

NOTE A.—The above recipe gives the amount of this material originally present. During the polymerization reaction 0.5 part additional were added after two hours and 0.5 part additional were added after three hours on stream.

NOTE B.—The above recipe gives the amount of this material present at the start of the polymerization reaction. During the polymerization reaction 0.04 part additional were added after two hours and 0.04 part additional were added after three hours on stream.

The above materials were placed in a reactor which was sealed and entered into a heated water bath where the reactor contents were brought to a temperature of 120° F. (50° C.). The polymerization reaction was allowed to proceed under agitation for a total of four hours at the temperature level given. As set forth in the above recipe notes, at the end of two hours on stream a mixture of 0.5 parts by weight sodium dodecyl benzene sulfonate and of 0.04 parts by weight p-menthane hydroperoxide were injected into the reaction vessel, this operation being repeated at the end of three hours on stream. At the end of a total of four hours at reaction temperature the reaction was essentially complete as indicated by a lack of pressure in the reactor and essential lack of odor exhibited by the reaction product.

Example 2

Representative graft copolymer blending components B were prepared using the following recipes which are expressed in parts by weight:

| Designation of blending component B formed | 1 | 2 | 3 |
|---|---|---|---|
| Source of butadiene-styrene copolymer latex | Note A | Note B | Note C |
| Butadiene | 20 | 23.3 | 36 |
| Styrene | 20 | 10.0 | 4 |
| Subtotal | 40 | 33.3 | 40 |
| Methyl methacrylate | 60 | 66.7 | 60 |
| Grand total | 100 | 100 | 100 |
| Remaining recipe components: | | | |
| Water, total | 182 | 182 | 182 |
| Sodium salt of hydrogenated disproportionated rosin | 1.96 | | 1.96 |
| Sodium hydroxide | 0.15 | 0.15 | 0.15 |
| Sodium pyrophosphate, anhydrous | 0.5 | 0.5 | 0.5 |
| Commercial glucose | 1.0 | 1.0 | 1.0 |
| Ferrous sulfate heptahydrate | 0.011 | 0.011 | 0.011 |
| Sodium dodecyl benzene sulfonate | 2.0 | | 2.0 |
| Cumene hydroperoxide (73% strength) | 1.0 | 1.0 | 1.0 |
| Alkyl aryl sodium sulfonate | | 2.0 | |

NOTE A.—A commercial 50:50 butadiene:styrene copolymer latex of about 40% solids content.
NOTE B.—A commercial 70:30 butadiene:styrene copolymer latex of about 60% solids content.
NOTE C.—Preparation described in Example 1.

In the preparation of the above blending components, the mixtures set forth in the individual recipes were individually heated to 60° C. and allowed to react under agitation for 0.5 hour at which time an additional 1.0 part by weight of the 73% strength cumene hydroperoxide was added to the reaction mixture following which agitation was continued at the temperature previously given for an additional hour. At the end of this time reaction was essentially complete.

At the conclusion of the polymerization reaction an emulsion containing one part by weight 2,6-ditertiary butyl p-cresol and 0.5 part by weight polyalkyl polyphenols was added to each of the resulting latices. These materials improve the environmental stability of the final products. Other suitable stabilizers or mixtures thereof may be employed in lieu of the specific materials named or, if desired, use of a stabilizer or stabilizer mixture may be dispensed with entirely with some sacrifice, of course, in the environmental stability of the products.

Each of the stabilized latices was then separately worked up by conventional procedures. These involved coagulating an individual latex by mixing with a comparatively large volume of a solution of an electrolyte (dilute sulfuric acid solution), heating this resulting coagulated mixture to near the boiling point thereof (to produce partial agglomeration and granulation of the coagulum, thus facilitating subsequent filtering and washing operations), separating the coagulum by filtration, washing and drying.

The blending components prepared as above described are obtained in excellent yields in the form of rather brittle resins. Thus, the graft copolymer designated 2 in the above table was obtained in 98.3% yield, as a material having a Rockwell hardness of 75 (R scale) and a notched Izod impact value at 23° C. of 1.2 foot pounds per inch of notch.

*Example 3*

The present example describes the preparation of representative graft copolymers of a butadiene-styrene copolymer latex with a methyl methacrylate-styrene mixture. As previously indicated, the resulting products are employed as blending components B in the practice of this invention.

In each of the following recipes, the sum of the butadiene-styrene copolymer and of the methyl methacrylate-styrene monomer mixture equals 100 parts by weight, the butadiene-styrene copolymer comprising 40 parts of this 100 parts total and the methyl methacrylate-styrene monomer mixture, correspondingly, representing 60 parts of this total. The remaining components of the various polymerization recipes were identical, both with respect to their nature and amounts employed per 100 parts by weight butadiene-styrene copolymer plus methyl methacrylate-styrene monomer mixture. Accordingly, these remaining components of the polymerization recipes are listed but once in the following table.

While a constant 40:60 ratio of butadiene-styrene copolymer:methyl methacrylate-styrene monomer mixture was employed in preparing all of the graft copolymer blending components B of the following table, the butadiene:styrene ratio of the copolymer varied. Thus, the butadiene to styrene ratio of the copolymer used in forming the blending component designated 4 was 50:50; this butadiene to styrene ratio was 70:30 in the copolymer used in forming graft copolymer blending component 5 and was 90:10 in the copolymer of blending component 6. In contrast, in all instances in the following table, the monomer mixture polymerized with these copolymers to form the blending components B employed in the practice of this invention contained methyl methacrylate and styrene in a 75:25 ratio (in parts by weight).

| Designation of blending component B formed | 4 | 5 | 6 |
|---|---|---|---|
| Source of butadiene-styrene copolymer latex | Note A | Note B | Note C |
| Copolymer latex components: | | | |
| Butadiene | 20 | 28 | 36 |
| Styrene | 20 | 12 | 4 |
| Subtotal | 40 | 40 | 40 |
| Monomer mixture components: | | | |
| Methyl methacrylate | 45 | 45 | 45 |
| Styrene | 15 | 15 | 15 |
| Subtotal | 60 | 60 | 60 |
| Grand total | 100 | 100 | 100 |
| Water, total | | 182 | |
| Sodium salt of hydrogenated disproportionated rosin | | 1.96 | |
| Sodium hydroxide | | 0.15 | |
| Sodium pyrophosphate, anhydrous | | 0.5 | |
| Commercial glucose | | 1.0 | |
| Ferrous sulfate heptahydrate | | 0.011 | |
| Sodium dodecyl benzene sulfonate | | 2.0 | |
| Cumene hydroperoxide (73% strength) | | 1.0 | |

NOTES A to C.—See corresponding notes of the table of Example 2.

The preparation, stabilization and isolation of the blending components B of this example followed the corresponding directions previously given in connection with Example 2.

The butadiene-styrene ratio of the copolymer latex used in forming the blending components B employed in the practice of this invention does not appear to be critical. As may be seen from a consideration of Examples 2 and 3, butadiene-styrene ratios of 1:1 to 9:1 were used in preparing the copolymer latex and, as a matter of fact, butadiene-styrene ratios much lower than 1:1, for example 1:3, may be used if desired.

The blending components B described in Example 2 were prepared using a 1:1.5 to 1:2 ratio of butadiene-styrene copolymer to methyl methacrylate monomer. The present invention is not limited to any such ratio range. Blending components B prepared using butadiene-styrene copolymer/methyl methacrylate ratios over a wide range are effective in achieving the objects of this invention. Thus, blending components B made with butadiene-styrene copolymer to methyl methacrylate ratios ranging from 1:1 to 1:4 are highly effective for achieving the objects of this invention.

Likewise, while the blending components B described in Example 3 hereof were prepared using a constant 1:1.5 ratio of butadiene-styrene copolymer to methyl methacrylate-styrene monomer mixture, the present invention is not limited to any such specific ratio. Blending components B prepared using butadiene-styrene copolymer: methyl methacrylate-styrene monomer mixture over a wide range of ratios are effective in accomplishing the objects of this invention. Thus, blending components B made with butadiene-styrene copolymer to methyl methacrylate-styrene monomer mixture ratios ranging from 1:1 to 1:4 are highly effective for accomplishing the objects of this invention.

The ratio of methyl methacrylate to styrene in the monomer mixture polymerized with the butadiene-styrene copolymer to form blending components B is quite devoid of criticality. Actually, blending components B useful for accomplishing the objects of this invention may be prepared using a methyl methacrylate to styrene ratio of from about 1:3 upwards to 11:1 or even higher (since, as has been previously set forth, a ratio of infinity is operative).

In the preparation of blends of this invention a predominant proportion of interpolymer A is employed in conjunction with a small amount of blending component B. In the preparation of blends of this invention, from about 1% to about 15% by weight of blending component B is incorporated into 99% to 85% by weight of A. All points of view considered, blends exhibiting the most favorable combination of properties are obtained when blending component B and A are blended together in a weight ratio in the neighborhood of 1:9.

As has been previously set forth, component A of the blends of this invention may be prepared employing reactants selected from rather extensive lists of equivalents and the particular reactants selected may be used in proportions extending over a considerable range. Similarly, the present application amply demonstrates that the blending component B of the blends of this invention likewise may be formed employing reactants selected from rather extensive lists of equivalents and the particular reactants selected may be used in proportions extending over a considerable range. However, it has been found that blends of these two graft copolymers within the range of proportions set forth in the previous paragraph exhibit an essentially similar combination of properties regardless of the exact nature of the selected reactants and the proportions thereof used in forming the respective graft copolymers. Accordingly, to present all available data on blends prepared in accordance with this invention would be essentially repetitive and would result in a specification of inordinate length.

In view of the considerations set forth in the previous paragraph, Example 4 to follow gives representative physical properties of blends made from a single typical graft copolymer A and a single typical graft copolymer blending component B.

The graft copolymer A employed in Example 4 was a graft copolymer produced from a polybutadiene latex and a styrene-acrylonitrile monomer mixture. Butadiene (in the form of a polymer latex), styrene and acrylonitrile were used in the respective proportions 30:45:25 in the preparation of this particular graft copolymer A.

The blending component B employed in Example 4 was produced from a butadiene-styrene copolymer latex and methyl methacrylate in the proportions shown in connection with blending component B designated 2 in Example 2 hereof.

While blends in accordance with this invention contain from about 1% to about 15% of blending component B and, correspondingly, from 99% to 85% of A, the data of the table of Example 4 cover blends containing the two interpolymers in proportions up to 50:50 to show the deterioration in certain physical properties of the blend as the proportions of blending component B is increased appreciably beyond the maximum given for blends in accordance with this invention. Also, as a matter of interest, the table of Example 4 gives the physical properties of the straight 100% A employed in preparing the blends of the table.

Example 4

In preparing the blends shown in the following tabulation the two components, in the proportions given, were milled on a two roll mill using a roll temperature of 330° F. The two graft copolymers were very compatible and blending was accomplished with ease. It was noticed that the translucency of the blends increased on increasing the proportion of blending component B in the blend.

Specimens required for certain physical testing procedures were prepared by molding the various mill sheets (and, also, graft copolymer A) at a mold temperature of 350°–360° F.

| Interpolymer Blend No. | Note A | 7 | 8 | 9 | 10 |
|---|---|---|---|---|---|
| Parts by weight, blending component A | 100 | 100 | 100 | 100 | 100 |
| Parts by weight, blending component B | 0 | 5 | 10 | 50 | 100 |
| Physical properties: | | | | | |
| Tensile strength, lbs. sq. in. A.S.T.M. D-638 | 4,699 | 4,591 | 4,811 | 4,788 | 4,725 |
| Elongation at Break, Percent A.S.T.M. D-638 | 76 | 110 | 106 | 71 | 58 |
| Heat Distortion Point, ° C., A.S.T.M. D-648 | 96.0 | 96.5 | 95.5 | 95.0 | 93.5 |
| Izod Impact Value at 23° C., ft. lb./in. notch,⅛ inch specimen, A.S.T.M. D-256 | 5.17 | 4.56 | 4.43 | 3.44 | 2.76 |
| Rockwell Hardness, R Scale, A.S.T.M. D-785 | 87 | 92 | 93 | 97 | 99 |
| A 1 Melt Index (Note B) | 1.1 | 1.6 | 1.5 | | |

NOTE A.—Straight graft copolymer A.
NOTE B.—Modification of A.S.T.M. Method D-1238. The procedure set forth in A.S.T.M. Method D-1238 was originally developed for determining the melt index of polyethylene. Broadly and briefly, in this method, the weight in grams of polyethylene that is discharged during a period of three minutes through a standard orifice positioned below a reservoir of the polymer that is at a standard temperature and under a standard pressure is determined. This determination is proportioned to give the grams of polymer discharged during ten minutes which figure is, by definition, the melt index of the polyethylene. Since the thermoplasticity of the blends with which this invention is concerned is not even of the same order of magnitude as that of polyethylene, a considerable modification of A.S.T.M. Method D-1238 had to be made in order to make the general procedure applicable to the blends with which this invention is concerned. These modfications involved changes in the size of the orifice, the pressure applied to the blend in the reservoir, the reservoir temperature, and the like. As used here, the melt indices designated A 1 express the weight in grams of blend discharged in one minute through an orifice 0.125 inch in diameter and 0.315 inch long from a reservoir 0.373 inch in diameter containing blend at a temperature of 410° F. and under a pressure produced by a 5664 gram load. Thus, a melt index of 1.1 A 1 means that 1.1 g. of blend were extruded in one minute under the conditions set forth.

The above data show that incorporation of blending component B into A in any ratio has no significant effect on tensile strength. This is also essentially true with respect to heat distortion point although here it will be observed that the 50:50 blend does have a somewhat lower heat distortion point than blends containing a lower proportion of blending component B.

The impact values of the blends decrease progressively as the proportion of blending component B in the blends increases. However, within the range of blend compositions encompassed by this invention (i.e., blends containing from about 1% ot about 15% by weight of blending component B) the blends are high impact materials suitable for the fabrication of rigid shaped articles that may exhibit one or more sharp directional transitions in the design thereof and/or may be subjected to vibration, shock, impact loads and the like during use. However, as may be seen from the above table, if the proportion of blending component B is increased appreciably above the upper limit specified for blends coming within the purview of this invention, a serious decline in impact value follows. With the upper limit for blending component B in the blends of this invention at about 15% by weight, such a decline in impact value is avoided. (For purposes of orientation, it may be noted that Commercial Standard CS 201–55 of the United States Department of Commerce, relating to rigid polyvinylchloride sheets, requires a minimum impact value of 3.0 foot pounds for "high impact" materials. On this basis, since the blends of the above table coming within the purview of this invention have impact values well above four foot pounds they are defininitely "high impact" materials.)

The surface hardness of the blends of the above table increases as the proportion of blending component B increases but since the amount of this component that may be used in forming blends coming within the purview of this invention is strictly limited the maximum possible enhancement in hardness is not exhibited by the specific blends of this invention although the blends of this invention exhibit an important increase in surface hardness in comparison with the surface hardness of straight graft copolymer A.

Additionally, the blends of this invention exhibit an important increase in A 1 melt index in comparison with that of straight graft copolymer A.

However it is in elongation, with respect to both amount and type, that the specific blends encompassed by this invention show important advantages over both the straight graft copolymer A and blends containing more than the maximum amount of blending component B specified for the blends of this invention. The blends of this invention exhibit an elongation 40%–45% greater than the elongation of straight graft copolymer A and an elongation 50%–55% greater than the elongation of blends containing appreciably more belnding component B than the maximum specified for the blends of this invention.

While not amenable to numerical expression, the greater elongation of the blends of this invention is of a different type from that exhibited by graft copolymer A. A test specimen of 100% graft copolymer A, when subjected to the standard elongation test procedure, "necks down" during elongation so that the greater part of the elongation occurs over a very small portion of the total length of the test specimen. In contrast, as the blends of this invention elongate during the testing procedure a fairly uniform reduction of cross sectional area occurs over the total length of the test specimen. Obviously, this avoidance of "necking down" by the blends of this invention accounts, in large measure at least, for the very high elongation values they exhibit.

Be it remembered, that while this invention has been described in connection with specific details and specfic embodiments thereof, these details and embodiments are illustrative only and are not to be considered limitations

I claim:
1. A strong, tough, impact resistant blend comprising the following separate components:
   (A) A material obtained by polymerizing a mixture of 30% to 70% by weight of a material selected from the group consisting of styrene, alpha methyl styrene, vinyl toluenes and alpha methyl vinyl toluenes and 10% to 30% by weight of a material selected from the group consisting of acrylonitrile and methacrylonitrile in the presence of 20% to 60% by weight of a material selected from the group consisting of conjugated aliphatic diolefine homopolymer latices and conjugated aliphatic diolefine-monovinyl aromatic hydrocarbon copolymer latices—
      85% to 99% by weight based on the total weight of (A) and (B), and
   (B) A material obtained by polymerizing 80% to 50% by weight of a material selected from the group consisting of alkyl alkacrylates and a mixture of an alkyl alkacrylate and monovinyl aromatic hydrocarbon in the presence of 20% to 50% by weight of a conjugated aliphatic diolefine-monovinyl aromatic hydrocarbon copolymer—
      15% to 1% by weight based on the total weight of (A) and (B).

2. A strong, tough, impact resistant blend comprising the following separate components:
   (A) A material obtained by polymerizing a mixture of 30% to 70% by weight styrene and 10% to 30% by weight acrylonitrile in the presence of 20% to 60% by weight butadiene-styrene copolymer—
      85% to 99% by weight based on the total weight of (A) and (B), and
   (B) A material obtained by polymerizing 80% to 50% by weight of a material selected from the group consisting of alkyl alkacrylates and a mixture of an alkyl alkacrylate and a vinyl aromatic hydrocarbon in the presence of 20% to 50% by weight of a conjugated aliphatic diolefine-monovinyl aromatic hydrocarbon copolymer—
      15% to 1% by weight based on the total weight of (A) and (B).

3. A strong, tough, impact resistant blend comprising the following separate components:
   (A) A material obtained by polymerizing a mixture of 30% to 70% by weight styrene and 10% to 30% by weight acrylonitrile in the presence of 20% to 60% by weight of a butadiene-styrene copolymer—
      85% to 99% by weight based on the total weight of (A) and (B), and
   (B) A material obtained by polymerizing 80% to 50% by weight methyl methacrylate in the presence of 20% to 50% by weight of a butadiene-styrene copolymer—
      15% to 1% by weight based on the total weight of (A) and (B).

4. A strong, tough, impact resistant blend comprising the following separate components:
   (A) A material obtained by polymerizing a mixture of 30% to 70% by weight styrene and 10% to 30% by weight acrylonitrile in the presence of 20% to 60% by weight butadiene-styrene copolymer—
      85% to 99% by weight based on the total weight of (A) and (B), and
   (B) A material obtained by polymerizing 80% to 50% by weight of a mixture of methyl methacrylate and styrene in the presence of 20% to 50% by weight of a butadiene-styrene copolymer—
      15% to 1% by weight based on the total weight of (A) and (B).

5. A strong, tough, impact resistant blend comprising the following separate components:
   (A) A material obtained by polymerizing a mixture of 30% to 70% by weight styrene and 10% to 30% by weight acrylonitrile in the presence of 20% to 60% by weight of polybutadiene—
      85% to 99% by weight based on the total weight of (A) and (B), and
   (B) A material obtained by polymerizing 80% to 50% by weight of a material selected from the group consisting of alkyl alkacrylates and a mixture of alkyl alkacrylates and monovinyl aromatic hydrocarbons in the presence of 20% to 50% by weight of a conjugated aliphatic diolefine-monovinyl aromatic hydrocarbon copolymer—
      15% to 1% by weight based on the total weight of (A) and (B).

6. A strong, tough, impact resistant blend comprising the following separate components:
   (A) A material obtained by polymerizing a mixture of 30% to 70% by weight styrene and 10% to 30% by weight acrylonitrile in the presence of 20% to 60% by weight of polybutadiene—
      85% to 99% by weight based on the total weight of (A) and (B), and
   (B) A material obtained by polymerizing 80% to 50% by weight methyl methacrylate in the presence of 20% to 50% by weight of butadiene-styrene copolymer—
      15% to 1% by weight based on the total weight of (A) and (B).

7. A strong, tough, impact resistant blend comprising the following separate components:
   (A) A material obtained by polymerizing a mixture of 30% to 70% by weight styrene and 10% to 30% by weight acrylonitrile in the presence of 20% to 60% by weight of polybutadiene—
      85% to 99% by weight based on the total weight of (A) and (B), and
   (B) A material obtained by polymerizing 80% to 50% by weight methyl methacrylate in the presence of 20% to 50% by weight of a butadiene-styrene copolymer latex comprising 25 to 90 parts by weight butadiene and correspondingly 75 to 10 parts by weight styrene—
      15% to 1% by weight based on the total weight of (A) and (B).

8. A strong, tough, impact resistant blend comprising the following separate components:
   (A) A material obtained by polymerizing a mixture of about 45% by weight styrene and about 25% by weight acrylonitrile in the presence of about 30% by weight of polybutadiene—
      about 95% by weight based on the total weight of (A) and (B), and
   (B) A material obtained by polymerizing about 67% by weight methyl methacrylate in the presence of about 33% by weight of a butadiene-styrene copolymer latex comprising about 70 parts by weight butadiene with correspondingly about 30 parts by weight styrene—
      about 5% by weight based on the total weight of (A) and (B).

9. A strong, tough, impact resistant blend comprising the following separate components:
   (A) A material obtained by polymerizing a mixture of 30% to 70% by weight styrene and 10% to 30% by weight acrylonitrile in the presence of 20% to 60% by weight of polybutadiene—
      85% to 99% by weight based on the total weight of (A) and (B), and
   (B) A material obtained by polymerizing 80% to 50% by weight of a mixture of methyl methacrylate and styrene in the presence of 20% to 50% by weight of a butadiene-styrene copolymer—
      15% to 1% by weight based on the total weight of (A) and (B).

10. A strong, tough, impact resistant blend comprising the following separate components:
(A) A material obtained by polymerizing a mixture of 30% to 70% by weight styrene and 10% to 30% by weight acrylonitrile in the presence of 20% to 60% by weight of polybutadiene—
85% to 99% by weight based on the total weight of (A) and (B), and
(B) A material obtained by polymerizing 80% to 50% by weight of a mixture of methyl methacrylate and styrene having a methyl methacrylate-styrene ratio of at least 1:3 in the presence of 20% to 50% by weight of a butadiene-styrene copolymer latex comprising 25 to 90 parts by weight butadiene and correspondingly 75 to 10 parts by weight styrene— 15% to 1% by weight based on the total weight of (A) and (B).

References Cited in the file of this patent

UNITED STATES PATENTS

| | | |
|---|---|---|
| 2,614,093 | Wheelock | Oct. 14, 1952 |
| 2,755,270 | Hayes | July 17, 1956 |
| 2,802,808 | Hayes | Aug. 13, 1957 |
| 2,857,360 | Feuer | Oct. 21, 1958 |
| 2,862,906 | Stein et al. | Dec. 2, 1958 |
| 2,862,907 | Stein et al. | Dec. 2, 1958 |
| 2,908,661 | Calvert | Oct. 13, 1959 |
| 2,943,074 | Feuer | June 28, 1960 |
| 2,948,703 | Schroeder | Aug. 9, 1960 |